United States Patent
Wang

(10) Patent No.: US 11,501,280 B2
(45) Date of Patent: Nov. 15, 2022

(54) JOINT PAYMENT METHOD AND SYSTEM BASED ON BINDING RELATIONSHIP

(71) Applicant: Advanced New Technologies Co., Ltd., Grand Cayman (KY)

(72) Inventor: Xianghong Wang, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

(21) Appl. No.: 17/163,068

(22) Filed: Jan. 29, 2021

(65) Prior Publication Data

US 2021/0150509 A1    May 20, 2021

Related U.S. Application Data

(63) Continuation of application No. PCT/CN2019/110513, filed on Oct. 11, 2019.

(30) Foreign Application Priority Data

Nov. 28, 2018  (CN) .......................... 201811430699.X

(51) Int. Cl.
*G06Q 40/00* (2012.01)
*G06Q 20/32* (2012.01)
(Continued)

(52) U.S. Cl.
CPC ... *G06Q 20/3274* (2013.01); *G06K 19/06112* (2013.01); *G06Q 20/02* (2013.01); *G06Q 50/01* (2013.01)

(58) Field of Classification Search
CPC .... G06Q 20/3274; G06Q 20/02; G06Q 50/01; G06K 19/06112
See application file for complete search history.

(56) References Cited

U.S. PATENT DOCUMENTS 8,326,770 B1 * 12/2012 Weisman ............... G06Q 30/04
    707/798
10,997,592 B1 * 5/2021 Kurani ............... G06Q 20/3821
(Continued)

FOREIGN PATENT DOCUMENTS

WO    WO-2011053716 A1 *  5/2011  ............. G06Q 20/02

OTHER PUBLICATIONS

Francisco Liébana-Cabanillas et al: "The moderating effect of experience in the adoption of mobile paylnent tools in Virtual Social Networks: The in-Payment Acceptance Model in Virtual Social Networks (MPAM-VSN)", Department of Marketing and Market Research, University of Granada, Campus Jan. 2014 (Year: 2014).*

*Primary Examiner* — Edward J Baird
(74) *Attorney, Agent, or Firm* — Shun Yao; Yao Legal Services, Inc

(57) ABSTRACT

One embodiment provides a method and system for joint payment. During operation, a joint-payment server receives a joint-payment request comprising an identifier of a user initiating a joint payment and an identifier of a user to-be-included in the joint payment; determines, based the identifiers of the user initiating the joint payment and the to-be-included user, whether a binding relationship has been established between the user initiating the joint payment and the to-be-included user; in response to determining that the binding relationship has been established, generates graphic codes respectively corresponding to the user initiating the joint payment and the to-be-included user; and sends the graphic codes to a terminal device associated with the user initiating the joint payment, thereby facilitating the terminal device to display the graphic codes to complete the joint payment.

10 Claims, 6 Drawing Sheets

(51) Int. Cl.
  *G06K 19/06*  (2006.01)
  *G06Q 20/02*  (2012.01)
  *G06Q 50/00*  (2012.01)

(56) References Cited

U.S. PATENT DOCUMENTS

| | | | | |
|---|---|---|---|---|
| 2012/0150740 | A1* | 6/2012 | Isaacson | G06Q 50/01 |
| | | | | 705/41 |
| 2013/0073389 | A1* | 3/2013 | Heath | G06Q 30/02 |
| | | | | 705/14.54 |
| 2013/0318180 | A1* | 11/2013 | Amin | G06Q 30/0253 |
| | | | | 709/206 |
| 2014/0201067 | A1* | 7/2014 | Lai | G06Q 20/29 |
| | | | | 705/39 |
| 2015/0088674 | A1* | 3/2015 | Flurscheim | G06Q 20/3821 |
| | | | | 705/17 |
| 2015/0242911 | A1* | 8/2015 | Zises | G06Q 30/0605 |
| | | | | 705/14.64 |
| 2016/0180316 | A1* | 6/2016 | Wang | G06Q 20/4015 |
| | | | | 705/39 |
| 2017/0011029 | A1* | 1/2017 | Chatterjee | G06N 5/027 |
| 2017/0228710 | A1* | 8/2017 | Lee | G06Q 20/326 |
| 2018/0122022 | A1* | 5/2018 | Kelly | G06Q 50/12 |
| 2018/0315051 | A1* | 11/2018 | Hurley | G06Q 20/3255 |
| 2019/0114693 | A1* | 4/2019 | Zhang | G06Q 30/0637 |

* cited by examiner

JOINT PAYMENT METHOD AND SYSTEM BASED ON BINDING RELATIONSHIP

RELATED APPLICATION

Under 35 U.S.C. § 120 and § 365(c), this application is a continuation of PCT Application No. PCT/CN2019/110513, entitled "JOINT PAYMENT METHOD AND SYSTEM BASED ON BINDING RELATIONSHIP," by inventor Xianghong Wang, filed 11 Oct. 2019, which claims priority to Chinese Patent Application No. 201811430699.X, filed on 28 Nov. 2018.

TECHNICAL FIELD

Embodiments of the specification relate to the technical field of e-commerce, and in particular to a joint payment method and system based on a binding relationship.

BACKGROUND

The development of smart terminals and popularization of mobile payment provide great convenience to daily life of users. For example, subway is the main means of transportation for daily travels of users, and the users can take the subway by making payment via code scanning. That is, when entering a subway station, each user needs to display a graphic code thereof, and can enter the subway station only after identification is successfully performed on the graphic code; when exiting a subway station, the user needs to display the graphic code thereof again, and completes the payment to exit the station after identification is successfully performed. That is, currently a smart terminal of each user can only display a graphic code corresponding to the user himself to allow the user to complete payment and exit a station. However, in some special cases, for convenience, there is a need of a user to use a smart terminal thereof to display graphic codes respectively corresponding to a plurality of users to complete payment for exiting a station. Therefore, in scenarios in which payment by scanning is performed to take the subway, buy bus tickets, buy tickets for scenic spots, and the like, a solution to enable joint payment is urgently needed, so that a user can use a smart terminal thereof to display graphic codes respectively corresponding to a plurality of users to complete a joint payment.

SUMMARY

In view of the aforementioned technical problem, embodiments of the specification provide joint payment method and system based on a binding relationship. The technical solution is as follows:

One embodiment provides a method and system for joint payment. During operation, a joint-payment server receives a joint-payment request comprising an identifier of a user initiating a joint payment and an identifier of a user to-be-included in the joint payment; determines, based the identifiers of the user initiating the joint payment and the to-be-included user, whether a binding relationship has been established between the user initiating the joint payment and the to-be-included user; in response to determining that the binding relationship has been established, generates graphic codes respectively corresponding to the user initiating the joint payment and the to-be-included user; and sends the graphic codes to a terminal device associated with the user initiating the joint payment, thereby facilitating the terminal device to display the graphic codes to complete the joint payment.

In a variation on this embodiment, generating the graphic codes comprises: randomly generating a graphic code for each of the user initiating the joint payment and the to-be-included user.

In a variation on this embodiment, the terminal device is configured to display the graphic codes based on a predetermined display rule.

In a variation on this embodiment, in response to determining that the binding relationship has not been established, the joint-payment server notifies the user initiating the joint payment that the joint payment fails and guides the user initiating the joint payment to establish a binding relationship with the to-be-included.

In a variation on this embodiment, the system establishes a binding relationship between the user initiating the joint payment and one or more other users, which comprises: determining a number of users as possible objects of the binding relationship; recommending the determined number of users to the user initiating the joint payment; and receiving a selection from the user initiating the joint payment, the selection specifying one or more users as objects of the binding relationship.

In a further variation, the system sends a binding request to a user specified as an object of the binding relationship and receives a confirmation from the specified user to establish the binding relationship between the specified user and the user initiating the joint payment.

In a further variation, determining a number of users as possible objects of the binding relationship comprises one or more of: determining a degree of closeness between the user initiating the joint payment and a number of user friends; determining status of information exchange between the user initiating the joint payment and a number of user friends; and determining members of a family account activated by the user initiating the joint payment.

A joint payment method based on a binding relationship, the method comprising:

a client sending a joint payment request to a server, the joint payment request carrying an identifier of a joint payment initiator and an identifier corresponding to a current joint object;

the server parsing the identifier of the joint payment initiator and the identifier corresponding to the current joint object carried in the received joint payment request;

the server determining, according to the identifier of the joint payment initiator and the identifier corresponding to the current joint object, whether binding has been established between the joint payment initiator and the current joint object;

if so, the server generating graphic codes respectively corresponding to the joint payment initiator and the current joint object, and sending to the client the graphic codes respectively corresponding to the joint payment initiator and the current joint object; and the client receiving the graphic codes respectively corresponding to the joint payment initiator and the current joint object, and displaying the graphic codes respectively corresponding to the joint payment initiator and the current joint object so as to complete joint payment.

A joint payment method based on a binding relationship, applied to a client, the method comprising:

sending a joint payment request to a server, the joint payment request carrying an identifier of a joint payment initiator and an identifier corresponding to a current joint object;

receiving graphic codes respectively corresponding to the joint payment initiator and the current joint object, wherein generating the graphic codes respectively corresponding to the joint payment initiator and the current joint object comprises: the server determining, according to the identifier of the joint payment initiator and the identifier corresponding to the current joint object carried in the joint payment request, whether a binding relationship has been established between the joint payment initiator and the current joint object, and if so, generating the graphic codes respectively corresponding to the joint payment initiator and the current joint object; and displaying the graphic codes respectively corresponding to the joint payment initiator and the current joint object to complete joint payment.

A joint payment method based on a binding relationship, applied to a server, the method comprising:

receiving a joint payment request sent by a client;

parsing an identifier of a joint payment initiator and an identifier corresponding to a current joint object carried in the received joint payment request;

determining, according to the identifier of the joint payment initiator and the identifier corresponding to the current joint object, whether a binding relationship has been established between the joint payment initiator and the current joint object;

if so, the server generating graphic codes respectively corresponding to the joint payment initiator and the current joint object, and sending to the client the graphic codes respectively corresponding to the joint payment initiator and the current joint object, such that the client receives the graphic codes respectively corresponding to the joint payment initiator and the current joint object, and displays the graphic codes respectively corresponding to the joint payment initiator and the current joint object to complete joint payment.

A joint payment system based on a binding relationship, the system comprising a client and a server:

the client sends a joint payment request to the server, the joint payment request carrying an identifier of a joint payment initiator and an identifier corresponding to a current joint object;

the server parses the identifier of the joint payment initiator and the identifier corresponding to the current joint object carried in the received joint payment request;

the server determines, according to the identifier of the joint payment initiator and the identifier corresponding to the current joint object, whether a binding relationship has been established between the joint payment initiator and the current joint object;

if so, the server generates graphic codes respectively corresponding to the joint payment initiator and the current joint object, and sends to the client the graphic codes respectively corresponding to the joint payment initiator and the current joint object; and the client receives the graphic codes respectively corresponding to the joint payment initiator and the current joint object, and displays the graphic codes respectively corresponding to the joint payment initiator and the current joint object to complete joint payment.

A joint payment apparatus based on a binding relationship, applied to a client, the apparatus comprising:

a request sending module configured to send a joint payment request to a server, the joint payment request carrying an identifier of a joint payment initiator and an identifier corresponding to a current joint object;

a graphic code receiving module configured to receive graphic codes respectively corresponding to the joint payment initiator and the current joint object, wherein generating the graphic codes respectively corresponding to the joint payment initiator and the current joint object comprises: the server determining, according to the identifier of the joint payment initiator and the identifier corresponding to the current joint object carried in the joint payment request, whether a binding relationship has been established between the joint payment initiator and the current joint object, and if so, generating the graphic codes respectively corresponding to the joint payment initiator and the current joint object; and a graphic code displaying module configured to display the graphic codes respectively corresponding to the joint payment initiator and the current joint object to complete joint payment.

A joint payment apparatus based on a binding relationship, applied to a server, the apparatus comprising:

a request receiving module configured to receive a joint payment request sent by a client;

an identifier parsing module configured to parse an identifier of a joint payment initiator and an identifier corresponding to a current joint object carried in the received joint payment request;

a determining module configured determine, according to the identifier of the joint payment initiator and the identifier corresponding to the current joint object, whether a binding relationship has been established between the joint payment initiator and the current joint object; and a graphic code generating module configured to: if so, generate graphic codes respectively corresponding to the joint payment initiator and the current joint object, and send to the client the graphic codes respectively corresponding to the joint payment initiator and the current joint object, such that the client receives the graphic codes respectively corresponding to the joint payment initiator and the current joint object, and displays the graphic codes respectively corresponding to the joint payment initiator and the current joint object to complete joint payment.

According to the technical solution provided by the embodiments of the specification, a client sends a joint payment request to a server; the server parses an identifier of a joint payment initiator and an identifier corresponding to a current joint object carried in the received joint payment request, determines, according to the identifier of the joint payment initiator and the identifier corresponding to the current joint object, whether a binding relationship has been established between the joint payment initiator and the current joint object, and if so, generates graphic codes respectively corresponding to the joint payment initiator and the current joint object, and sends the same to the client; the client receives the graphic codes respectively corresponding to the joint payment initiator and the current joint object, and displays the graphic codes respectively corresponding to the joint payment initiator and the current joint object to complete joint payment. In this way, a user can use a smart terminal thereof to separately display graphic codes respectively corresponding to a plurality of users so as to complete joint payment.

It should be understood that the above general description and the following detailed description are only exemplary and explanatory, and should not limit the embodiments of the specification.

In addition, any one of embodiments of the specification is not required to achieve all of the above effects.

BRIEF DESCRIPTION OF THE DRAWINGS

In order to more clearly describe the technical solutions in the embodiments of the specification or the prior art, the drawings needed in the description of the embodiments or the prior art will be briefly introduced below. Apparently, the drawings in the description below are only some embodiments of the specification, and a person of ordinary skill in the art can further obtain other drawings according to these drawings.

DETAILED DESCRIPTION OF THE EMBODIMENTS

Figure 1:
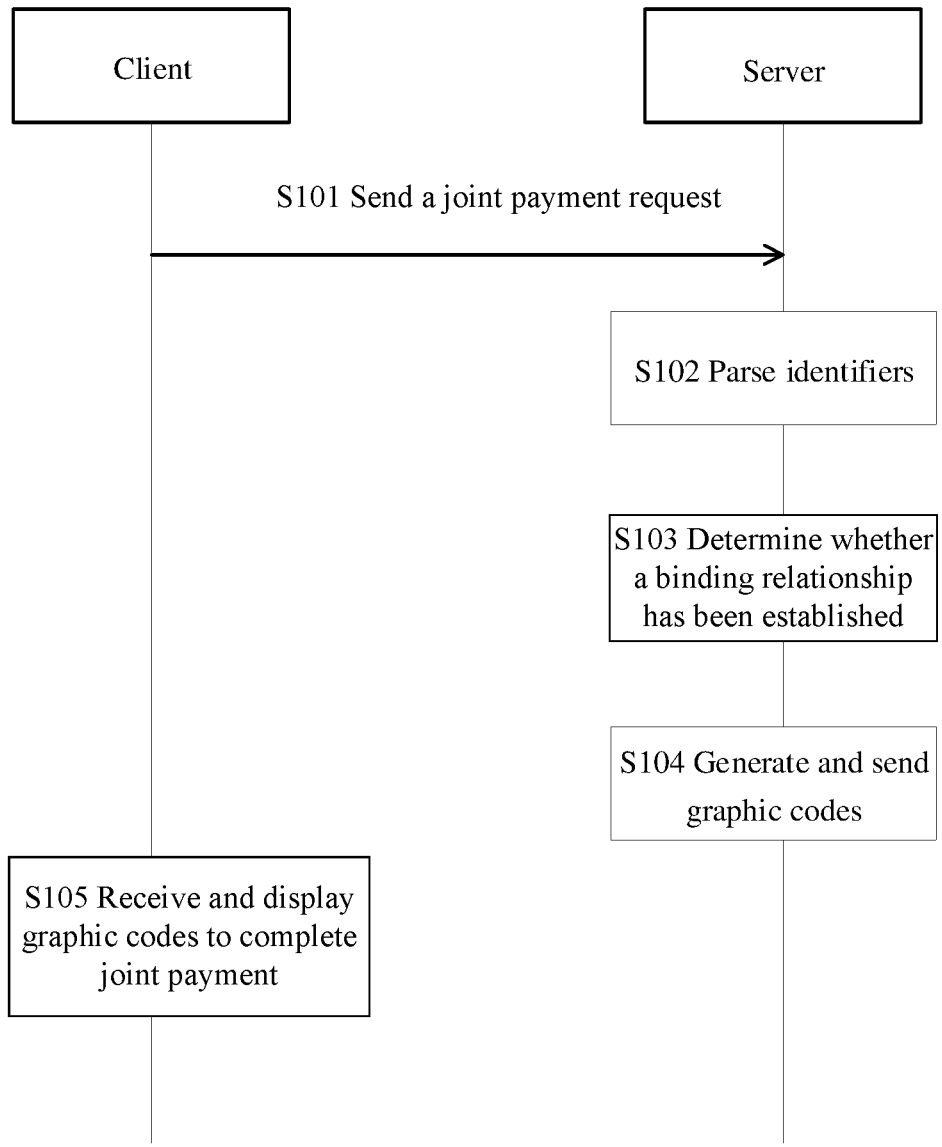
FIG. 1 is a schematic flowchart of joint payment method based on a binding relationship according to an embodiment of the specification.

As mentioned in the background, a user traveling by subway is often accompanied by family members, friends and especially non-adult children, and in order to enter a station rapidly, there is a need for the user to use his own smart terminal to display graphic codes respectively corresponding to the family members, friends, and children. After identification succeeds, the family members, friends, and children can enter the station in sequence. In order to exit a station, similarly there is the need for the user to use his own smart terminal to display the graphic codes respectively corresponding to the family members, friends, and children to complete joint payment, and then the family members, friends, and children can exit the station in sequence. In other application scenarios, when buying train ticket, buffet tickets, or tickets for scenic spot, a user is often accompanied by family members and friends, and in this case, there is also the need for user to use his own smart terminal to display graphic codes respectively corresponding to the family members and friends to complete joint payment. For similar application scenarios (application scenarios in which each person needs a ticket, and the number of persons is counted), details will not be described herein again.

In view of the aforementioned problem, the specification provides a technical solution for joint payment based on a binding relationship. It is determined whether a binding relationship between a joint payment initiator and a current joint object has been established. If so, graphic codes respectively corresponding to the joint payment initiator and the current joint object are generated and sent to a client. The client receives the graphic codes respectively corresponding to the joint payment initiator and the current joint object, and displays the graphic codes respectively corresponding to the joint payment initiator and the current joint object to complete joint payment. In this way, a user can use his own smart terminal to separately display, for a plurality of users, graphic codes respectively corresponding to each user so as to complete joint payment.

Specifically, the technical solution provided by the specification is as follows:

A client sends a joint payment request to a server, the joint payment request carrying an identifier of a joint payment initiator and an identifier corresponding to a current joint object; the server parses the identifier of the joint payment initiator and the identifier corresponding to the current joint object carried in the received joint payment request; the server determines, according to the identifier of the joint payment initiator and the identifier corresponding to the current joint object, whether a binding relationship has been established between the joint payment initiator and the current joint object; if so, the server generates graphic codes respectively corresponding to the joint payment initiator and the current joint object, and sends to the client the graphic codes respectively corresponding to the joint payment initiator and the current joint object; and the client receives the graphic codes respectively corresponding to the joint payment initiator and the current joint object, and displays the graphic codes respectively corresponding to the joint payment initiator and the current joint object to complete joint payment.

In the embodiments of the specification, the client is a client of an application installed on a smart terminal, such as an Alipay client, and the server can be in the form of a specific server or a server cluster. The client and the server can be communicatively connected to each other by means of a variety of networks, which is not limited in the specification.

In order to enable a person skilled in the art to better understand the technical solution in the embodiments of the specification, the technical solution in the embodiments of the specification will be described in detail below with reference to the drawings in the embodiments of the specification. It is apparent that the described embodiments are merely some, rather than all, of the embodiments of the specification. All other embodiments obtained by a person of ordinary skill in the art based on the embodiments of the specification shall fall within the protection scope.

In order to better describe the technical solution provided by the embodiments of the specification, the specification provides method for establishing a binding relationship applied to a server, and joint payment can be completed on the basis of the binding relationship.

Specifically, a method for establishing a binding relationship provided by an embodiment of the specification can include the following steps:

S1, upon receiving a display operation instruction of a user for a graphic code, determine that the user is an initiator for a binding relationship.

Using as an example, a current graphic code for riding the subway, when a user enters a page of a graphic code for taking the subway, i.e., it is determined that a display operation instruction of the user for a graphic code is received, and it is determined that the user is an initiator for a binding relationship. For example, before riding the subway, a user A opens a page of a graphic code for riding the subway. Therefore, it can be determined that a display operation instruction of user A for a graphic code is received, and it can be determined that user A is an initiator for the binding relationship.

S2, determine objects of the binding relationship from user friends having existing friendship with the user.

After the initiator of the binding relationship is determined, objects of the binding relationship can be determined from user friends having existing friendship with the user; alternatively, while determining of the initiator of the binding relationship, objects of the binding relationship are determined at the same time from user friends having existing friendship with the user, which is not limited by the embodiments of the specification. Specifically, objects of the binding relationship can be determined from the user friends having existing friendship with the user in the following manner.

A degree of closeness between each of the user friends (e.g., contacts labeled as friends or family members in the user's contact list) having existing friendship with the user and the user can be determined, and a user friend having a closeness degree with the user meeting a preset requirement is determined as an object of the binding relationship. Specific degree of closeness can be embodied in the form of a closeness value. For example, a degree of closeness between a user D and user A is 95. Correspondingly, determining that a user friend having a closeness degree with the user meeting a preset requirement is the object of the binding relationship can be determining that a user friend having a closeness degree with the user not less than a preset threshold value is the object of the binding relationship.

For example, user friends having existing friendship with user A are: user D, a user E, and a user F. From the user friends having existing friendship with user A, a degree of closeness between each user friend and user A is determined. That is, a degree of closeness between user D and user A, a degree of closeness between user E and user A, and a degree of closeness between user F and user A are separately determined. Specifically, the degree of closeness between user D and user A is 95; the degree of closeness between user E and user A is 90; the degree of closeness between user F and user A is 85; the preset threshold value of closeness is 90. Therefore, it can be determined that user D and user E are objects of the binding relationship.

Alternatively, a status of information exchange between each of user friends having existing friendship with the user and the user is determined, and it is determined that a user friend is an object of the binding relationship if the status of information exchange between the user friend and the user meets a preset requirement. Specifically, in a preset time period (such as one month or two weeks), the count and frequency of chatting between each of the user friends having existing friendship with the user and the user are statistically acquired, and therefore the status of information exchange between each of the user friends and the user can be determined. It is determined that a user friend is an object of the binding relationship if the count and frequency of chatting between the user friend and the user are not less than preset thresholds.

In addition, it can also be determined whether the user has activated a family account. If so, it is determined that members included in the family account are objects of a binding relationship; if not, the user may be prompted to activate a family account.

For example, it is determined that user A has activated a family account, and members included the family account are the father, mother, and daughter. Then, it can be determined that the father, mother, and daughter are objects of a binding relationship.

S3, recommend the determined objects of a binding relationship to the initiator of the binding relationship, so that the initiator of the binding relationship preferentially selects the determined objects of the binding relationship.

For the objects of the binding relationship determined in S2, the determined objects of the binding relationship are recommended to the initiator of the binding relationship, that is, the determined objects of the binding relationship are recommended to the user, so that the initiator of the binding relationship preferentially selects the determined objects of the binding relationship.

For example, the determined objects of the binding relationship are a user B, a user C, and user D. The determined objects of the binding relationship, namely user B, user C, and user D, are recommended to user A, so that user A preferentially selects user B, user C, and user D.

S4, according to the objects of the binding relationship selected by the initiator of the binding relationship, send a binding request to the selected objects of the binding relationship, so that the selected objects of the binding relationship accept binding to the initiator of the binding relationship.

The initiator of the binding relationship may select one or more of the objects of the binding relationship recommended in S3, or may directly select one or more of the user friends having existing friendship with himself, that is, ignoring the recommended objects of the binding relationship, or may select multiple from the recommended objects of the binding relationship and the user friends having existing friendship with himself.

According to the objects of the binding relationship selected by the initiator of the binding relationship, a binding request is sent to the selected objects of the binding relationship. The binding request can be sent to the selected objects of the binding relationship according to a preset sending rule, so that the selected objects of the binding relationship agree to be bound to the initiator of the binding relationship. The binding request can be sent to the selected objects of the binding relationship according to the following rule:

After the initiator of the binding relationship completes selecting the objects of the binding relationship, the initiator of the binding relationship sends the binding request to the selected objects of the binding relationship in one time by means of broadcasting, or sends, according to a sequence in which the initiator of the binding relationship selects the objects of the binding relationship, the binding request to the selected objects of the binding relationship in sequence by means of unicast. There are a variety of specific sending rules, which are not limited by the specification.

S5, receive a response notification returned by a selected object of the binding relationship, and establish the binding relationship between the initiator of the binding relationship and the object of the binding relationship.

After the binding request is sent to the selected object of the binding relationship, the object of the binding relationship performs authorization upon receiving the binding request, and returns a response notification to a server. Upon receiving a response notification returned by an object of the binding relationship selected by the initiator of the binding relationship, the server determines that the response notification indicates agreement to be bound, and establishes the binding relationship between the initiator of the binding relationship and the object of the binding relationship on the basis of basic information (such as a name, age, a user account, and the like) of the initiator of the binding relationship and basic information of the object of the binding relationship.

For example, after response notifications respectively returned by user B, user C, and user D are received, it is determined that the response notifications indicate agreement to be bound, and a binding relationship, such as user A-user B, user A-user C, and user A-user D, is separately established on the basis of basic information of the initiator of the binding relationship A, basic information of user B, basic information of user C, and basic information of user D.

In addition, after the binding relationship is completely established, the initiator of the binding relationship is prompted that the binding relationship has been established, and objects bound to the initiator of the binding relationship are marked in an account of the initiator of the binding relationship.

On the basis of the aforementioned binding relationship establishment method, as shown in FIG. 1, which is a schematic flowchart of a joint payment method based on binding relationship according to the specification, and the method may specifically include the following steps:

S101, a client sends a joint payment request to a server, the joint payment request carrying an identifier of a joint payment initiator and an identifier corresponding to a current joint object.

After a user selects a corresponding joint object, the client sends a joint payment request to the server, the joint payment request carrying an identifier corresponding to a joint payment initiator and an identifier corresponding to a current joint object. The user is the joint payment initiator. The current joint object is the joint object selected by the user. The joint object selected by the user may be an object bound to the user, and can also be a user friend of the user.

For example, joint objects currently selected by a user A are the father and the mother, and a joint object selected next time by user A may be the father; the client sends a joint payment request to the server, the joint payment request carrying an identifier of user A, an identifier of the father, and an identifier of the mother. The identifier herein can be a name, age, a user account, and the like, namely information that can uniquely identify a user.

S102, the server parses the identifier of the joint payment initiator and the identifier corresponding to the current joint object carried in the received joint payment request.

The server receives the joint payment request, and parses the identifier of the joint payment initiator and the identifier of the current joint object carried therein. For example, the server parses the identifier of the user A: LI San, 35, 1306 . . . ; an identifier of a user B: ZHANG San, 55, 1306 . . . ; an identifier of a user C: LI Si, 56, 1306 . . . .

S103, the server determines, according to the identifier of the joint payment initiator and the identifier corresponding to the current joint object, whether a binding relationship has been established between the joint payment initiator and the current joint object;

For the identifier of the joint payment initiator and the identifier corresponding to the current joint object acquired by means of parsing in S102, it can be determined, according to the identifier of the joint payment initiator and the identifier corresponding to the current joint object, whether a binding relationship has been established between the joint payment initiator and the current joint object.

Specifically, searching can be performed according to the identifier of the joint payment initiator and the identifier corresponding to the current joint object to find whether there is a binding relationship between the joint payment initiator and the current joint object. For example, the identifier corresponding to the joint payment initiator, namely user A, is LI San, 35, 1306 . . . , and the identifier corresponding to the current joint object, namely user B, is ZHANG San, 55, 1306 . . . ; by means of searching, it is found that a binding relationship between LI San and ZHANG San (LI San, 35, 1306 . . . -ZHANG San, 55, 1306 . . . ) exists; that is, a binding relationship between the joint payment initiator user A and the current joint object user B has been established.

S104, if so, the server generates graphic codes respectively corresponding to the joint payment initiator and the current joint object, and sends to the client the graphic codes respectively corresponding to the joint payment initiator and the current joint object;

If a binding relationship between the joint payment initiator and the current joint object has been established, the server randomly generates, according to the identifier of the joint payment initiator and the identifier corresponding to the current joint object, graphic codes respectively corresponding to the joint payment initiator and the current joint object. The graphic code herein can be a two-dimensional code, a barcode, or the like.

The graphic codes respectively corresponding to the joint payment initiator and the current joint object are sent to the client. Preferably, the graphic codes randomly generated by the server and respectively corresponding to the joint payment initiator and the current joint object can have a validity period, such as one minute, and after one minute, the server randomly generates graphic codes respectively corresponding to the joint payment initiator and the current joint object again, sends to the client a notification to update the graphic codes, and sends to the client the newly generated graphic codes respectively corresponding to the joint payment initiator and the current joint object.

If no binding relationship has been established between the joint payment initiator and the current joint object, the joint payment initiator is notified that joint payment fails, and the joint payment initiator is guided to establish a binding relationship with the current joint object. Herein, in a case in which no binding relationship has been established between the joint payment initiator and current joint objects, it is possible that none of the current joint objects establishes a binding relationship with the joint payment initiator, or a part of the current joint objects do not establish a biding relationship with the joint payment initiator. The joint payment initiator can be specifically guided in the following manner to establish the binding relationship with the current joint object.

The server determines, from current joint objects, a joint object that has not established a binding relationship with the joint payment initiator, and sends a binding relationship establishment message to the client, so as to notify the joint payment initiator to establish a binding relationship with the determined joint object. After the joint payment initiator has selected the determined joint object and made confirmation, the server sends a binding request to the determined joint object, establishes a binding relationship between the joint payment initiator and the determined joint object after receiving a response notification returned by the determined joint object, and informs the joint payment initiator that the binding relationship has been established.

S105, the client receives the graphic codes respectively corresponding to the joint payment initiator and the current joint object, and displays the graphic codes respectively corresponding to the joint payment initiator and the current joint object to complete joint payment.

The client receives the graphic codes sent by the server and respectively corresponding to the joint payment initiator and the current joint object, and displays, according to a preset display rule, the graphic codes respectively corresponding to the joint payment initiator and the current joint object to complete joint payment. In this case, the joint payment initiator can use his own smart terminal to use his own graphic code to complete payment for himself, and use his own smart terminal to use the graphic code corresponding to the joint object to complete payment for the joint object. That is, joint payment for a plurality of users can be performed on the single smart terminal of the joint payment initiator. Specific amounts of payment incurred can be directly deducted from an account of the joint payment initiator, or respectively deducted from respective accounts of the joint payment initiator and the joint object, which is not limited by the specification.

Figure 2:
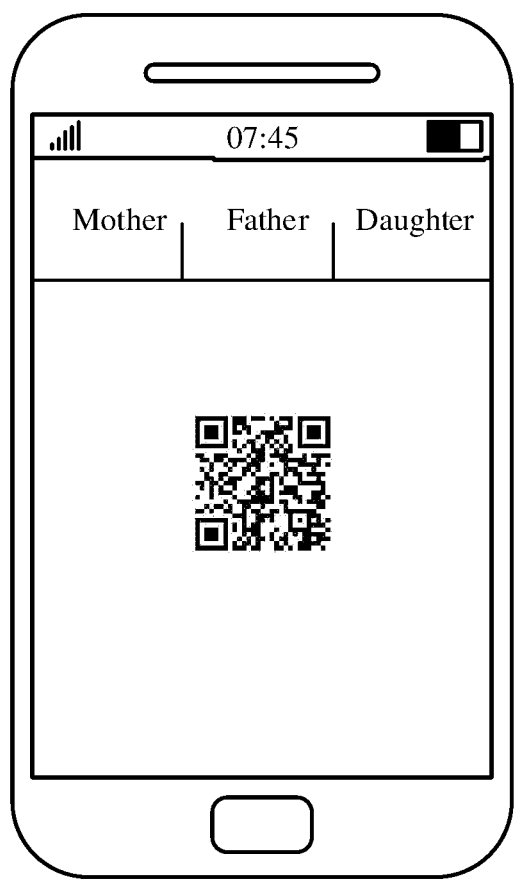
FIG. 2 is a schematic view of displaying a graphic code according to an embodiment of the specification.

The preset display rule herein can be as follows: the graphic codes respectively corresponding to the joint payment initiator and the current joint object can be automatically displayed in sequence according to a preset time interval, or the graphic codes respectively corresponding to the joint payment initiator and the current joint object can be displayed in the form of a menu, as shown in FIG. 2, so that the joint payment initiator selects a corresponding graphic code. There are a variety of specific display rules, and details will not be described herein again.

According to the foregoing description of the technical solution provided by the specification, a client sends a joint payment request to a server; the server parses an identifier of a joint payment initiator and an identifier corresponding to a current joint object carried in the received joint payment request, determines, according to the identifier of the joint payment initiator and the identifier corresponding to the current joint object, whether a binding relationship has been established between the joint payment initiator and the current joint object, and if so, generates graphic codes respectively corresponding to the joint payment initiator and the current joint object, and sends the same to the client; the client receives the graphic codes respectively corresponding to the joint payment initiator and the current joint object, and displays the graphic codes respectively corresponding to the joint payment initiator and the current joint object to complete joint payment. In this way, a user can use his own smart terminal to separately display graphic codes respectively corresponding to a plurality of users so as to complete joint payment.

In order to more clearly describe the solution of the embodiments of the specification, executed methods are respectively described below from angles of respective sides.

For a client, a task to be executed mainly includes:

A, sending a joint payment request to a server, the joint payment request carrying an identifier of a joint payment initiator and an identifier corresponding to a current joint object; and B, receiving graphic codes respectively corresponding to the joint payment initiator and the current joint object, and displaying the graphic codes respectively corresponding to the joint payment initiator and the current joint object to complete joint payment.

For a server, a task to be executed mainly includes:

a, parsing an identifier of a joint payment initiator and an identifier corresponding to a current joint object carried in a received joint payment request;

b, determining, according to the identifier of the joint payment initiator and the identifier corresponding to the current joint object, whether a binding relationship has been established between the joint payment initiator and the current joint object; and c, if so, generating graphic codes respectively corresponding to the joint payment initiator and the current joint object, and sending to a client the graphic codes respectively corresponding to the joint payment initiator and the current joint object.

For details of the methods executed on respective sides of the client and the server, reference can be made to the foregoing description of the embodiments, and details will not be described herein again.

Figure 3:
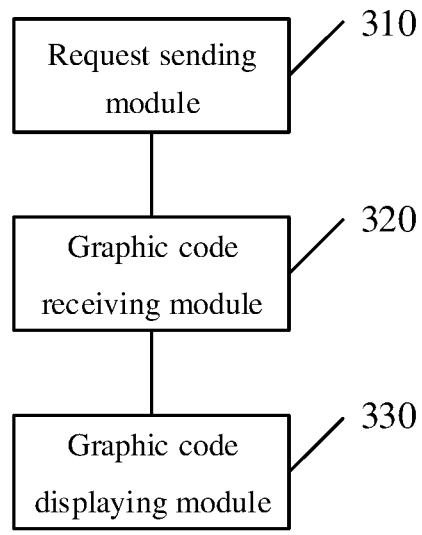
FIG. 3 is a schematic structural diagram of a joint payment apparatus based on a binding relationship applied to a client according to an embodiment of the specification.

With respect to the aforementioned method embodiments, an embodiment of the specification further provides a joint payment apparatus based on a binding relationship, applied to a client. As shown in FIG. 3, the apparatus includes: a request sending module 310, a graphic code receiving module 320, and a graphic code displaying module 330.

Request sending module 310 is configured to send a joint payment request to a server, the joint payment request carrying an identifier of a joint payment initiator and an identifier corresponding to a current joint object;

graphic code receiving module 320 is configured to receive graphic codes respectively corresponding to the joint payment initiator and the current joint object, wherein generating the graphic codes respectively corresponding to the joint payment initiator and the current joint object comprises: the server determining, according to the identifier of the joint payment initiator and the identifier corresponding to the current joint object carried in the joint payment request, whether a binding relationship has been established between the joint payment initiator and the current joint object, and if so, generating the graphic codes respectively corresponding to the joint payment initiator and the current joint object; and graphic code displaying module 330 is configured to display the graphic codes respectively corresponding to the joint payment initiator and the current joint object so as to complete joint payment.

Figure 4:
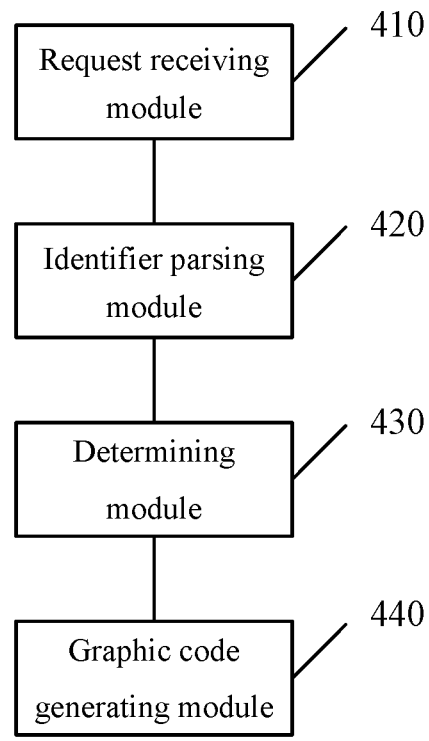
FIG. 4 is a schematic structural diagram of a joint payment apparatus based on a binding relationship applied to a server according to an embodiment of the specification.

The specification further provides a joint payment apparatus based on a binding relationship, applied to a server. As shown in FIG. 4, the apparatus includes: a request receiving module 410, an identifier parsing module 420, a determining module 430, and a graphic code generating module 440.

The request receiving module is configured to receive a joint payment request sent by a client;

the identifier parsing module is configured to parse an identifier of a joint payment initiator and an identifier corresponding to a current joint object carried in the received joint payment request;

the determining module is configured to determine, according to the identifier of the joint payment initiator and the identifier corresponding to the current joint object, whether a binding relationship has been established between the joint payment initiator and the current joint object; and the graphic code generating module is configured to, if so, generate graphic codes respectively corresponding to the joint payment initiator and the current joint object, and send to the client the graphic codes respectively corresponding to the joint payment initiator and the current joint object, such that the client receives the graphic codes respectively corresponding to the joint payment initiator and the current joint object, and displays the graphic codes respectively corresponding to the joint payment initiator and the current joint object to complete joint payment.

The specification further provides a joint payment system based on a binding relationship, the system including a client and a server:

the client sends a joint payment request to the server, the joint payment request carrying an identifier of a joint payment initiator and an identifier corresponding to a current joint object;

the server parses the identifier of the joint payment initiator and the identifier corresponding to the current joint object carried in the received joint payment request;

the server determines, according to the identifier of the joint payment initiator and the identifier corresponding to the current joint object, whether a binding relationship has been established between the joint payment initiator and the current joint object;

if so, the server generates graphic codes respectively corresponding to the joint payment initiator and the current joint object, and sends to the client the graphic codes respectively corresponding to the joint payment initiator and the current joint object; and the client receives the graphic codes respectively corresponding to the joint payment initiator and the current joint object, and displays the graphic codes respectively corresponding to the joint payment initiator and the current joint object to complete joint payment.

According to the foregoing description of the technical solution provided by the specification, a client sends a joint payment request to a server; the server parses an identifier of a joint payment initiator and an identifier corresponding to a current joint object carried in the received joint payment request, determines, according to the identifier of the joint payment initiator and the identifier corresponding to the current joint object, whether a binding relationship has been established between the joint payment initiator and the current joint object, and if so, generates graphic codes respectively corresponding to the joint payment initiator and the current joint object, and sends the same to the client; the client receives the graphic codes respectively corresponding to the joint payment initiator and the current joint object, and displays the graphic codes respectively corresponding to the joint payment initiator and the current joint object to complete joint payment. In this way, a user can use his own smart terminal to separately display graphic codes respectively corresponding to a plurality of users so as to complete joint payment.

Figure 5:
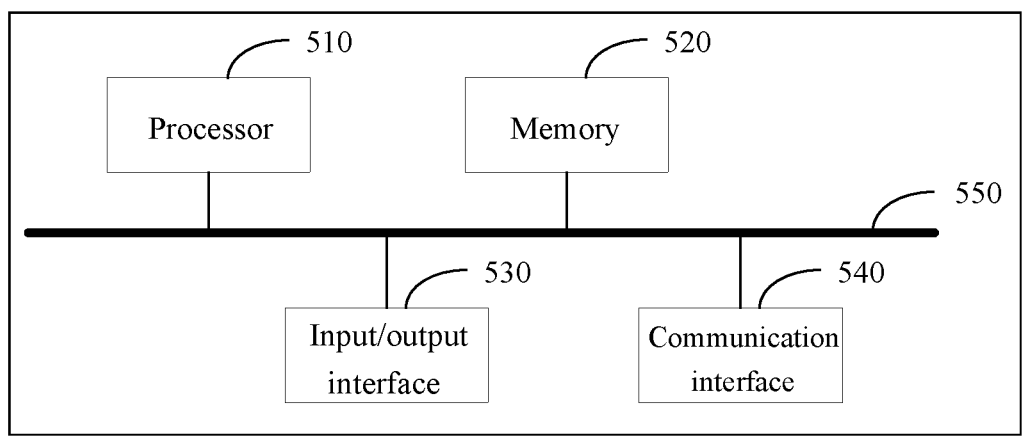
FIG. 5 is a schematic structural diagram of a device for configuring an apparatus according to an embodiment of the specification.

An embodiment of the specification further provides a computer device. As shown in FIG. 5, the device can include a processor 510, a memory 520, an input/output interface 530, a communication interface 540, and a bus 550. Processor 510, memory 520, input/output interface 530, and communication interface 540 are communicatively connected to each other in the device by means of bus 550.

Processor 510 may be implemented by adopting a general-purpose Central Processing Unit (CPU), a microprocessor, an Application Specific Integrated Circuit (ASIC), or one or more integrated circuits, etc., for executing related programs to implement the technical solution provided by the embodiments of the specification.

Memory 520 can be implemented in the form of a Read Only Memory (ROM), a Random Access Memory (RAM), a static memory device, a dynamic memory device, or the like. Memory 520 can store an operating system and other applications. When the technical solution provided by the embodiments of the specification is implemented by means of software or firmware, relevant program code is stored in memory 520, and is called and executed by processor 510.

Input/output interface 530 is for being connected to an input/output module so as to implement information input and output. The input/output module can be configured as a component in the device (not shown in the drawing), or can be externally connected to the device so as to provide a corresponding function. An input device can include a keyboard, a mouse, a touch screen, a microphone, a variety of sensors, and the like. An output device can include a display, a speaker, a vibrator, an indicator light, and the like.

Communication interface 540 is for being connected to a communication module (not shown) to achieve communication interactions between the device and other devices. The communication module may implement communication through a wired mode (for example, USB, network cable, etc.), and may also implement communication through a wireless mode (for example, a mobile network, Wi-Fi, Bluetooth, etc.).

Bus 550 includes a path for transmitting information among components (such as processor 510, memory 520, input/output interface 530, and communication interface 540) of the device.

It should be noted that although only processor 510, memory 520, input/output interface 530, communication interface 540, and bus 550 in the aforementioned device are shown, the device may further include other necessary components required for normal operation in a specific implementation process. In addition, a person skilled in the art can understand that the apparatus may only include components necessary to implement the technical solution provided by an embodiment of the present application, and does not necessarily include all components illustrated in the drawings.

An embodiment of the specification further provides a computer-readable storage medium on which a computer program is stored, and the program is executed by a processor to implement the aforementioned joint payment method based on a binding relationship. The method includes at least:

A joint payment method based on a binding relationship, applied to a client, the method including:

sending a joint payment request to a server, the joint payment request carrying an identifier of a joint payment initiator and an identifier corresponding to a current joint object;

receiving graphic codes respectively corresponding to the joint payment initiator and the current joint object, wherein generating the graphic codes respectively corresponding to the joint payment initiator and the current joint object comprises: the server determining, according to the identifier of the joint payment initiator and the identifier corresponding to the current joint object carried in the joint payment request, whether a binding relationship has been established between the joint payment initiator and the current joint object, and if so, generating the graphic codes respectively corresponding to the joint payment initiator and the current joint object; and displaying the graphic codes respectively corresponding to the joint payment initiator and the current joint object to complete joint payment.

An embodiment of the specification further provides a computer-readable storage medium on which a computer program is stored, and the program is executed by a processor to implement the aforementioned joint payment method based on a binding relationship. The method includes at least:

A joint payment method based on a binding relationship, applied to a server, the method including:

receiving a joint payment request sent by a client;

parsing an identifier of a joint payment initiator and an identifier corresponding to a current joint object carried in the received joint payment request;

determining, according to the identifier of the joint payment initiator and the identifier corresponding to the current joint object, whether a binding relationship has been established between the joint payment initiator and the current joint object;

if so, the server generating graphic codes respectively corresponding to the joint payment initiator and the current joint object, and sending to the client the graphic codes respectively corresponding to the joint payment initiator and the current joint object, such that the client receives the graphic codes respectively corresponding to the joint payment initiator and the current joint object, and displays the graphic codes respectively corresponding to the joint payment initiator and the current joint object to complete joint payment.

The computer-readable medium includes permanent and non-permanent, movable and non-movable media that can achieve information storage by means of any methods or techniques. The information may be computer-readable instructions, data structures, modules of programs or other data. Examples of a storage medium of a computer include, but are not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible by a computing device. According to the definitions herein, the computer-readable medium does not include transitory computer-readable media (transitory media), such as a modulated data signal and a carrier wave.

Figure 6:
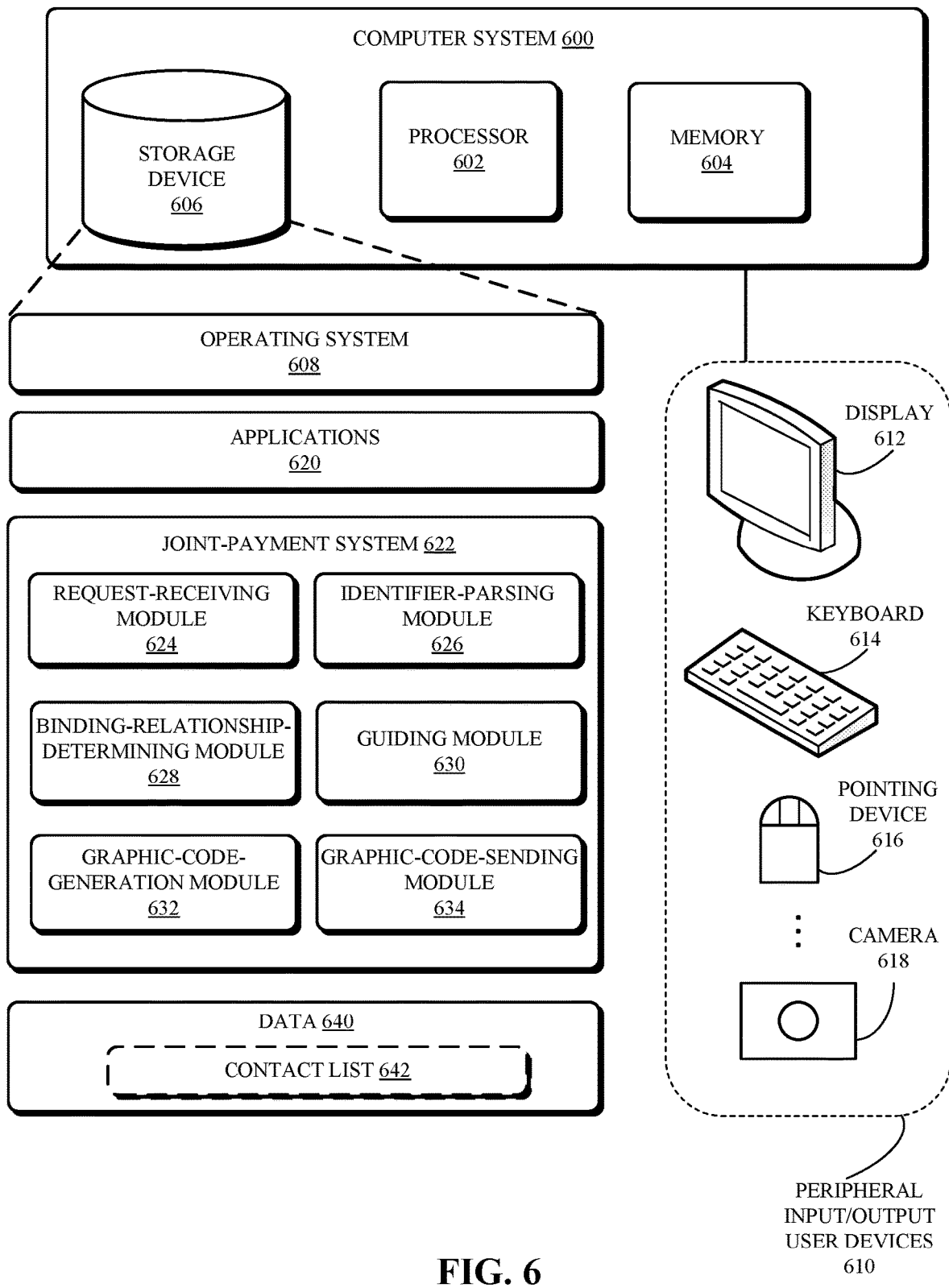
FIG. 6 illustrates an exemplary computer and communication system for joint payment, according to one embodiment.

FIG. 6 illustrates an exemplary computer and communication system for joint payment, according to one embodiment. In FIG. 6, computer system 600 can include a processor 602, a memory 604, and a storage device 606. Furthermore, computer system 600 can be coupled to peripheral input/output (I/O) user devices 610, e.g., a display device 612, a keyboard 614, a pointing device 616, and a camera 618. Storage device 606 can store an operating system 608, one or more applications 620, a joint-payment system 622, and data 640.

Applications 620 can include instructions, which can be loaded from storage device 606 into memory 604 and executed by processor 602. As a result, computer system 600 can perform specific functions provided by applications 620.

Joint-payment system 622 can include instructions, which when executed by computer system 600, can cause computer system 600 or processor 602 to perform methods and/or processes described in this disclosure. Specifically, joint-payment system 622 can include instructions for receiving a joint-payment request comprising an identifier of the joint-payment initiator and one or more identifiers of the joint objects (request-receiving module 624), instructions for parsing the identifiers (identifier-parsing module 626), instructions for determining whether a binding relationship exists between the joint-payment initiator and a joint object (binding-relationship-determining module 628), instructions for guiding the joint-payment initiator to establish the binding relationship (guiding module 630), instructions for generating the graphic codes (graphic-code-generation module 632), and instructions for sending the graphic codes to the joint-payment initiator for display (graphic-code-sending module 634). Data 640 can optionally include user's contact or friend list 642.

In some embodiments, applications 620 and the various modules in joint-payment system 622, such as modules 624-634 can be partially or entirely implemented in hardware and can be part of processor 602. Further, in some embodiments, the system may not include a separate processor and memory. Instead, in addition to performing their specific tasks, modules 620 and 624-634, either separately or in concert, may be part of general- or special-purpose computation engines.

Figure 7:
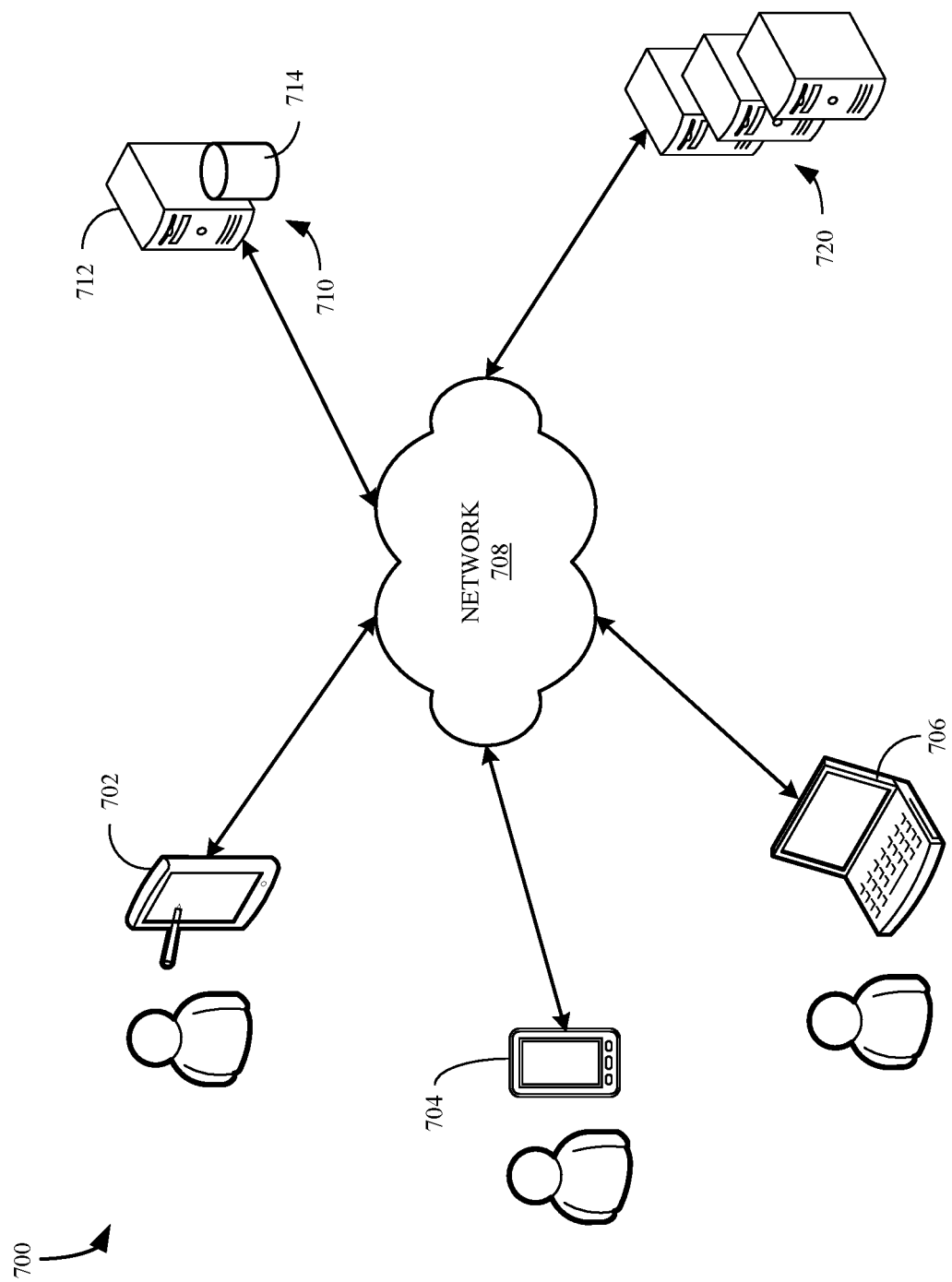
FIG. 7 illustrates an exemplary network environment for implementing the disclosed technology, in accordance with some embodiments described herein.

FIG. 7 illustrates an exemplary network environment for implementing the disclosed technology, in accordance with some embodiments described herein. A network environment 700 includes a number of electronic devices 702, 704 and 706 communicably connected to a server 710 by a network 708. One or more remote servers 720 are further coupled to the server 710 and/or the one or more electronic devices 702, 704 and 706.

In some exemplary embodiments, electronic devices 702, 704 and 706 can be computing devices such as laptop or desktop computers, smartphones, PDAs, wearable devices (e.g., smartwatches, smartglasses, etc.) portable media players, tablet computers, televisions or other displays with one or more processors coupled thereto or embedded therein, or other appropriate computing devices that can be used for displaying a web page or web application. In one example, the electronic devices 702, 704 and 706 store a user agent such as a browser or application. In the example of FIG. 7, electronic device 702 is depicted as a tablet computer, electronic device 704 is depicted as a smartphone, and electronic device 706 is depicted as a laptop computer.

Server 710 includes a processing device 712 and a data store 714. Processing device 712 executes computer instructions stored in data store 714, for example, to assist in scheduling a customer-initiated service or a service-provider-initiated service between a service provider and a customer at electronic devices 702, 704 and 706 during a service scheduling process.

In some exemplary aspects, server 710 can be a single computing device such as a computer server. In other embodiments, server 710 can represent more than one computing device working together to perform the actions of a server computer (e.g., cloud computing). The server 710 may host the web server communicably coupled to the browser at the client device (e.g., electronic devices 702, 704 or 706) via network 708. In one example, the server 710 may host a client application for scheduling a customer-initiated service or a service-provider-initiated service between a service provider and a customer during a service scheduling process. Server 710 may further be in communication with one or more remote servers 720 either through the network 708 or through another network or communication means.

The one or more remote servers 720 may perform various functionalities and/or storage capabilities described herein with regard to the server 710, either alone or in combination with server 710. Each of the one or more remote servers 720 may host various services. For example, servers 720 may host services providing information regarding one or more suggested locations such as web pages or websites associated with the suggested locations, services for determining the location of one or more users or establishments, search engines for identifying results for a user query, one or more user review or query services, or one or more other services providing information regarding one or more establishments, customers and/or reviews or feedback regarding the establishments.

Each of the one or more remote servers 720 can be a single computing device such as a computer server or can represent more than one computing device working together to perform the actions of a server computer (e.g., cloud computing). In one embodiment server 710 and one or more remote servers 720 may be implemented as a single server or a cluster of servers. In one example, server 710 and one or more remote servers 720 may communicate through the user agent at the client device (e.g., electronic devices 702, 704 or 706) via network 708.

Users may interact with the system hosted by server 710, and/or one or more services hosted by remote servers 720, through a client application installed at the electronic devices 702, 704, and 706. Alternatively, the user may interact with the system through a web-based browser application at the electronic devices 702, 704, and 706. Communication among client devices 702, 704, 706 and the system, and/or one or more services, may be facilitated through a network (e.g., network 708).

Communication among the client devices 702, 704, 706, server 710 and/or one or more remote servers 720 may be facilitated through various communication protocols. In some aspects, client devices 702, 704, 706, server 710 and/or one or more remote servers 720 may communicate wirelessly through a communication interface (not shown), which may include digital signal processing circuitry where necessary. The communication interface may provide for communications under various modes or protocols, including Global System for Mobile communication (GSM) voice calls; Short Message Service (SMS), Enhanced Messaging Service (EMS), or Multimedia Messaging Service (MMS) messaging; Code Division Multiple Access (CDMA); Time Division Multiple Access (TDMA); Personal Digital Cellular (PDC); Wideband Code Division Multiple Access (WCDMA); CDMA2000; or General Packet Radio System (GPRS), among others. For example, the communication may occur through a radio-frequency transceiver (not shown). In addition, short-range communication may occur, including via the use of a Bluetooth-enabled device, Wi-Fi®, or another such transceiver.

Network 708 can include, for example, any one or more of a personal area network (PAN), a local area network (LAN), a campus area network (CAN), a metropolitan area network (MAN), a wide area network (WAN), a broadband network (BBN), the Internet, and the like. Further, network 708 can include, but is not limited to, any one or more of the following network topologies, including a bus network, a star network, a ring network, a mesh network, a star-bus network, a tree or hierarchical network, and the like.

From the description of the above embodiment, it can be seen that a person skilled in the art can clearly understand that the embodiment of the specification can be implemented by means of software and a necessary general-purpose hardware platform. Based on such understanding, the technical solution provided by an embodiment of the present application or the part that contributes to the prior art may be embodied in the form of a software product. The computer software product may be stored in a storage medium, such as ROM/RAM, disk, optical disk, etc., and include several instructions used to enable a computer apparatus (which may be a personal computer, a server, a network apparatus, or the like) to execute the method described in each embodiment or some parts of each embodiment of the present application.

The system, apparatus, module, or unit illustrated in the aforementioned embodiments may be specifically implemented by a computer chip or an entity, or a product having a certain function. A typical implementation device is a computer, the specific form of a computer may be a personal computer, a laptop computer, a cellular telephone, a camera phone, a smartphone, a personal digital assistant, a media player, a navigation device, an email transceiver device, a gaming console, a tablet computer, a wearable device, or a combination of any of these devices.

Each embodiment of the present application is described in a progressive manner, and the same or similar sections between various embodiments are described with reference to each other, each of which is focused on the differences with other embodiments. Especially, the apparatus embodiment is described relatively briefly because it is substantially similar to the method embodiments, and for related parts, reference may be made to the method embodiments. The apparatus embodiment described above is only exemplary, in which the modules described as discrete components may or may not be physically separated, and the functions of each module may be implemented in the same or different software and/or hardware when the technical solution provided by an embodiment of the specification is implemented. Some or all modules may be selected to achieve the objective of the technical solution provided by the embodiments according to the actual needs. A person of ordinary skill in the art can understand and implement this without creative efforts.

What is claimed is:

1. A computer-executed method, the method comprising:

receiving, by a server, a joint-payment request from a terminal device associated with a first user, wherein the joint-payment request corresponds to a payment for a service or a product for two or more users, and wherein the joint-payment request includes a first identifier of the first user sending the joint-payment request;

determining, based on a status of information exchange between the first user and one or more to-be-included users, that a binding relationship exists between the first user and the one or more to-be-included users, wherein the determining is further based on a frequency and a count of the information exchange satisfying a pre-defined threshold;

recommending, to the first user, the one or more to-be-included users for providing the service or the product;

receiving, from the first user, selection of at least one to-be-included user for the binding relationship; and in response to determining, based on the first identifier of the first user and a second identifier of the at least one to-be-included user that a binding relationship has been established:

randomly generating a first graphic code based on the first identifier and a second graphic code based on the second identifier; and transmitting the first graphic code and the second graphic code to the terminal device, wherein the first user completes the joint payment by displaying the randomly generated first and second graphic codes to a code scanner.

2. The method according to claim 1, wherein the terminal device is configured to display the randomly generated first and second graphic codes based on a predetermined display rule.

3. The method according to claim 1, further comprising:
in response to determining that the binding relationship has not been established, notifying the first user that the joint payment fails; and
guiding the first user to establish a binding relationship with the at least one to-be-included user.

4. The method according to claim 1, further comprising:
sending a binding request to the at least one to-be-included user; and
receiving a confirmation from the at least one to-be-included user to establish the binding relationship between the specified user and the first user.

5. The method according to claim 1, wherein determining that the binding relationship exists between the first user and the one or more to-be-included users is further based on:
determining a degree of closeness between the first user and the one or more to-be-included users;
determining whether the degree of closeness meets a preset requirement; and
determining members of a family account activated by the first user.

6. A computer system, comprising:
a processor;
a storage device coupled to the processor and storing instructions, which when executed by the processor cause the processor to perform a method, the method comprising:
receiving a joint-payment request from a terminal device associated with a first user, wherein the joint-payment request corresponds to a payment for a service or a product for two or more users, and wherein the joint-payment request includes a first identifier of the first user sending the joint-payment request;
determining, based on a status of information exchange between the first user and one or more to-be-included users, that a binding relationship exists between the first user and the one or more to-be-included users, wherein the determining is further based on a frequency and a count of the information exchange satisfying a pre-defined threshold;
recommending, to the first user, the one or more to-be-included users for providing the service or the product;
receiving, from the first user, selection of at least one to-be-included user for the binding relationship; and
in response to determining, based on the first identifier of the first user and a second identifier of the at least one to-be-included user that a binding relationship has been established,
randomly generating a first graphic code based on the first identifier and a second graphic code based on the second identifier; and
transmitting the first graphic code and the second graphic code to the terminal device, wherein the first user completes the joint payment by displaying the randomly generated first and second graphic codes to a code scanner.

7. The computer system according to claim 6, wherein the terminal device is configured to display the randomly generated first and second graphic codes based on a predetermined display rule.

8. The computer system according to claim 6, wherein the method further comprises:
in response to determining that the binding relationship has not been established, notifying the first user that the joint payment fails; and
guiding the first user to establish a binding relationship with the at least one to-be-included user.

9. The computer system according to claim 6, wherein the method further comprises:
sending a binding request to the at least one to-be-included user; and
receiving a confirmation from the at least one to-be included user to establish the binding relationship between the specified user and the first user.

10. The computer system according to claim 6, wherein determining that the binding relationship exists between the first user and the one or more to-be-included users is further based on:
determining a degree of closeness between the first user and the one or more to-be-included users;
determining whether the degree of closeness meets a preset requirement; and
determining members of a family account activated by the first user.

* * * * *